United States Patent [19]

Ericksen

[11] Patent Number: 5,217,331

[45] Date of Patent: Jun. 8, 1993

[54] HARDWARE INSTALLATION TOOL

[76] Inventor: Colin W. Ericksen, P.O. Box 270222, San Diego, Calif. 92198

[21] Appl. No.: 843,284

[22] Filed: Feb. 27, 1992

[51] Int. Cl.[5] .................................. B23B 45/00
[52] U.S. Cl. ................................... 408/42; 408/53; 408/79; 408/112
[58] Field of Search ............... 408/42, 48, 53, 79, 408/110, 112, 114, 712

[56] References Cited

U.S. PATENT DOCUMENTS

| 2,506,202 | 5/1950 | Folkerth, Jr. | 408/42 |
| 2,918,833 | 12/1959 | Stewart et al. | 408/112 |
| 3,389,729 | 6/1968 | Macala | 408/112 |
| 4,728,230 | 3/1988 | Blum | 408/110 |
| 4,917,549 | 4/1990 | Geernaert | 408/112 |
| 5,085,543 | 2/1992 | Click | 408/112 |

FOREIGN PATENT DOCUMENTS

| 2846770 | 5/1980 | Fed. Rep. of Germany | 408/53 |
| 3531988 | 5/1987 | Fed. Rep. of Germany | 408/42 |
| 906648 | 2/1982 | U.S.S.R. | 408/79 |

Primary Examiner—Daniel W. Howell

[57] ABSTRACT

An in line drilling device for boring holes an equal distance from one another in wood, plastic or metal, comprising a set of geared together shafts equipped with drilling bits. The bit holder shafts are guided by bearings housed in a frame biased upwardly by springs. The fully compressed springs act to limit the extent of projection of the drill bits into a workpiece.

5 Claims, 3 Drawing Sheets

HARDWARE INSTALLATION TOOL

FIELD OF INVENTION

This invention relates to cabinetry and arose from the need to drill a series of holes in a row spaced an equal distance apart, to accept various types of cabinetry hardware installation.

DISCUSSION OF PRIOR ART

The present methods for in line hole boring involves either large expensive machinery or very simple drill guide bushing devices. The large machines are efficient but beyond the financial capabilities of most users. The drill guide bushing method is inexpensive but labor intensive, making this method very inefficient.

To overcome the disadvantages of both methods, the present invention is developed to provide line boring capabilities that is totally portable yet efficient in accomplishing in line drilling operations, while remaining affordable to the individual craftsman or business.

SUMMARY OF THE INVENTION

It is an object of the invention to drill a line of holes simultaneously in a workpiece with a multispindle portable device. The device may then be repositioned to drill a series of holes in line with the first holes. This may be continued at the discretion of the operator, producing a line of holes all spaced the same distance from one another. The depth of the holes being determined by the axial travel of the drill bit holders.

An embodiment of the invention provides that a downwardly biased positioning pin, with a tapered point of such an angle, as to automatically locate the device in varying sizes of previously drilled holes.

Another object of the invention is to be able to position the drilling device on a corner of a workpiece. The distance to the first hole may be varied to the requirements of the user, by lateral adjustment of two intermittent turn stops.

A further object of the invention is the provision of both laterally adjustable guide stops and intermittent downwardly biased guide stop pins on the base of the device. The intermittent guide stop pins position the drill bits in from the edge of a workpiece a given distance. The laterally adjustable guide stops can be varied to a user's requirements, and likewise, position the drill bits in from the edge of a workpiece when the laterally adjustable guide stops are employed, the intermittent guide stop pins retract up into the base of the device.

The principle object and essence of the device is therefore to provide a drilling assembly of the character here within described which enables a series of holes to be drilled at one time, a given distance in from the edge and corner of a workpiece to provide a line of holes spaced equally apart.

BRIEF DESCRIPTION OF THE DRAWINGS

Other objects and advantages of the invention will become more apparent from the specification taken in conjunction with the accompanying drawings which.

DETAILED DESCRIPTION OF THE INVENTION

Figure 3:
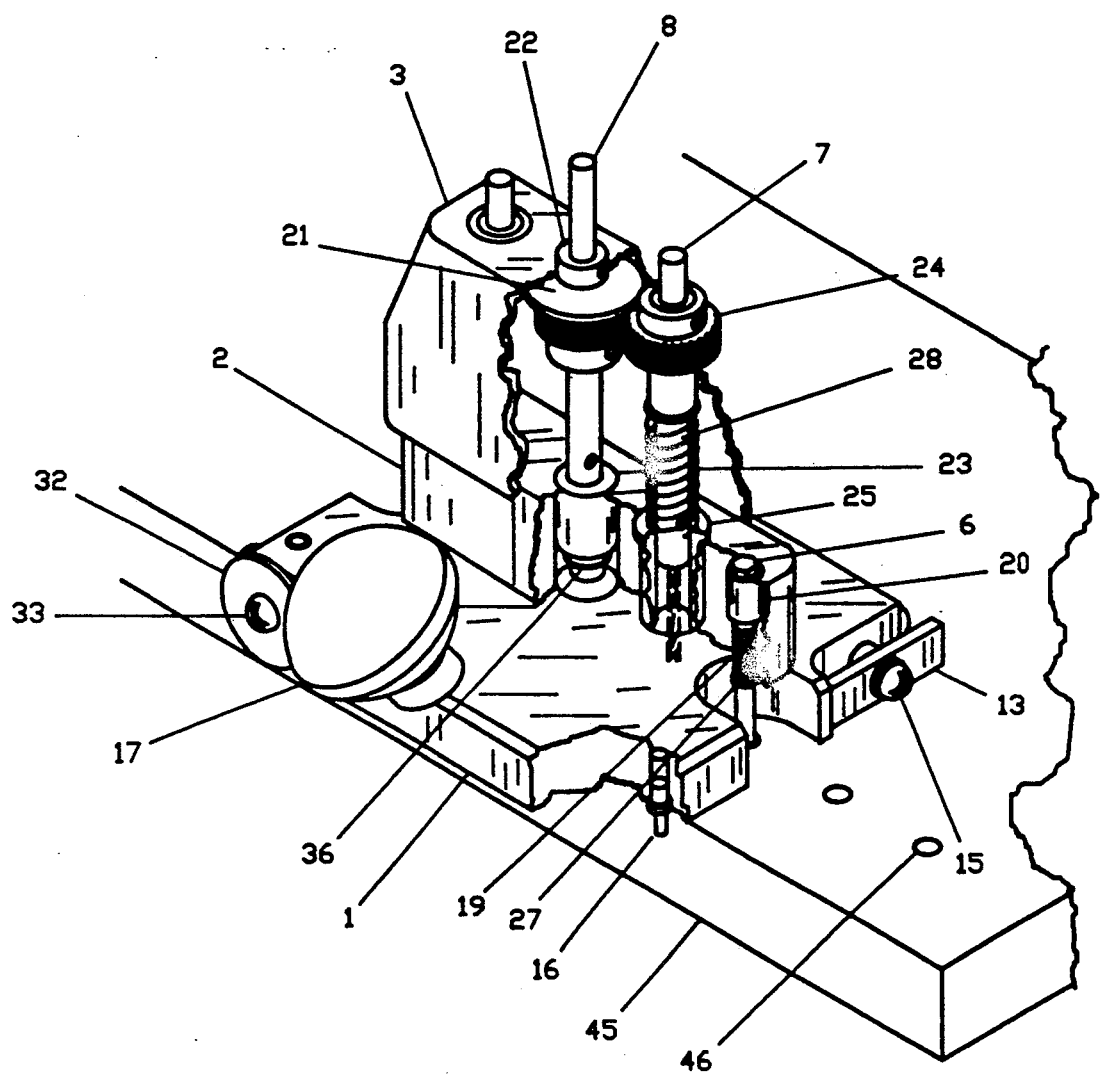
FIG. 3 is a cross sectional view of the in line boring device.

FIG. 3 shows the in line boring tool positioned on a workpiece. The first set of holes have been drilled by positioning the tool on the corner of the workpiece using turn stop 13 in a vertical posture in relation to the tools base 1, to catch the end of the workpiece and employing intermittent stops 16 against the edge of the workpiece. This aligns the tool with the edge of the workpiece and maintains a given distance from the workpiece edge to drill axis.

Figure 1:
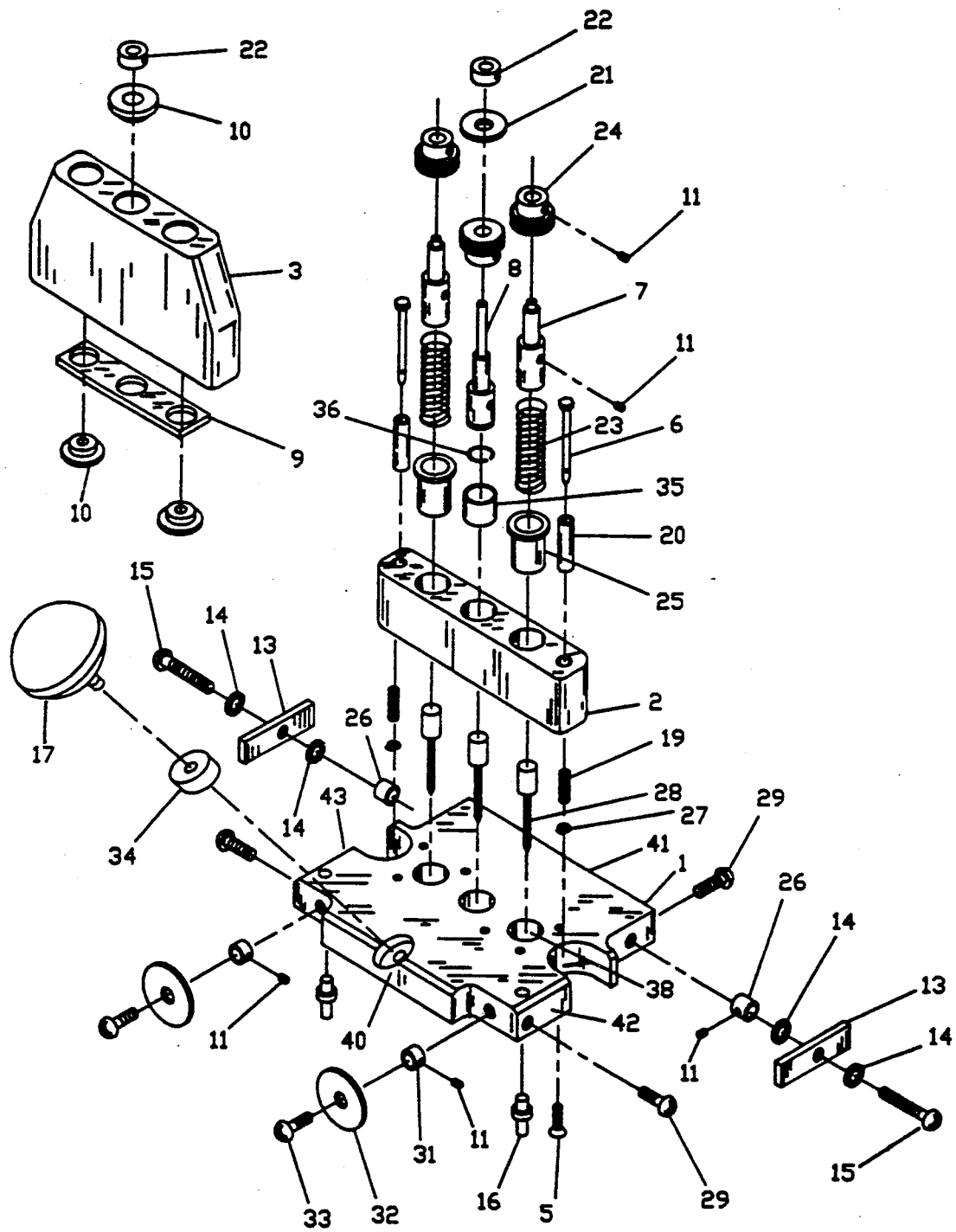
FIG. 1 is an exploded perspective view of the in line boring device.
Figure 2:
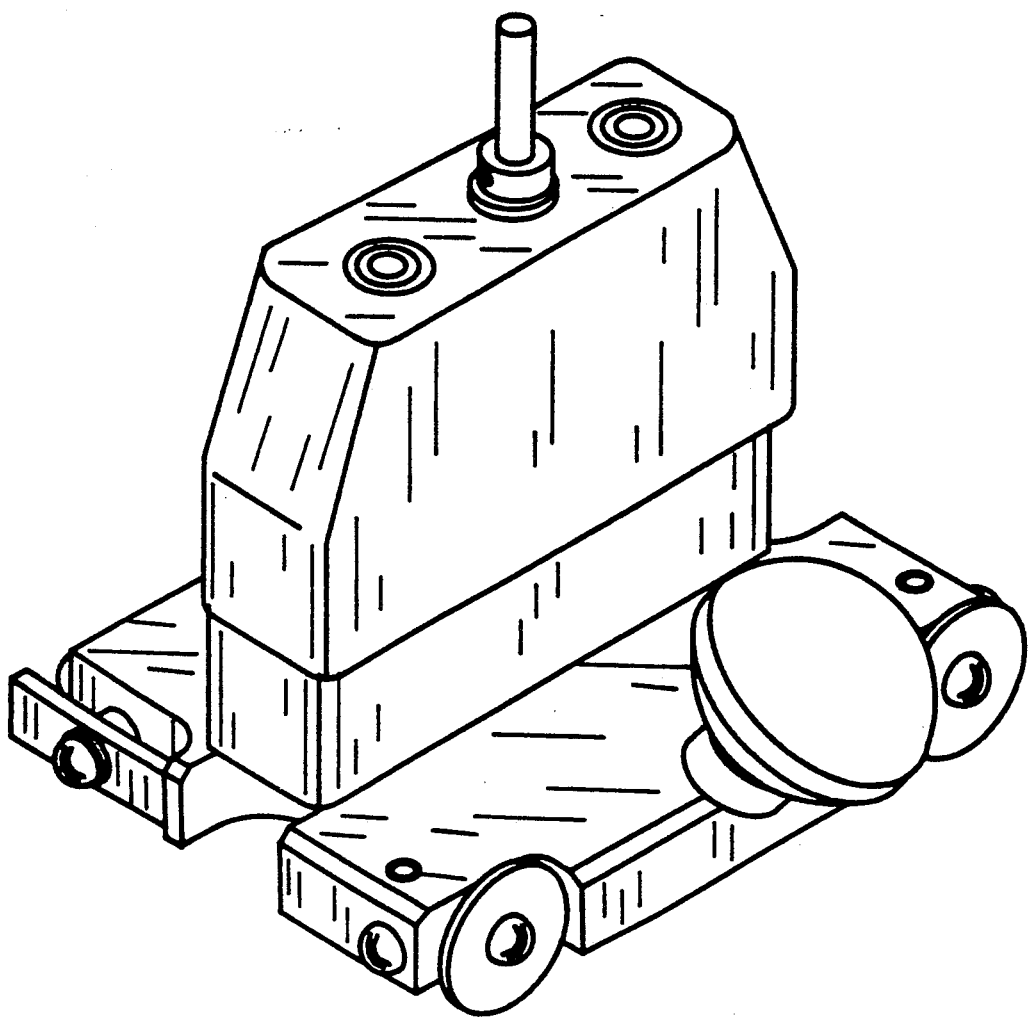
FIG. 2 is a perspective view of the assembled in line boring device.

The distance from the end of a workpiece to the drill axis can be increased by loosening set screw 29 and unscrewing screw 15. This laterally extends turn stop 13 relative to base 1 collar 26 with set screw 11 maintains washers 14 and turn stop 13 against the head of fastener 15 (FIG. 1). Set screw 29 can be retightened to retain turn stop 13 in an extended posture.

If a distance from edge of a workpiece to drill axis is required that is greater than the fixed distance from intermittent stop 16 to the drill axis, laterally adjustable stop guide assembly screw 33, washer 32, collar 31, with set screw 11 (FIG. 1,) can be used. By loosening screw 29 (FIG. 1) and unscrewing screw 33, the distance from washer 32 to drill axis can be increased. Set screw 11 in collar 31 maintains washer 32 against the head of fastener 33. Screw 29 can be tightened against the shaft of fastener 33, maintaining the laterally adjustable assembly in an extended position.

Intermittent stops 16 (FIG. 1 and FIG. 3) are biased downwardly by internal springs, and retract up into base 1 when employing laterally adjustable stop guide 32.

By returning turn stop 13 to a horizontal position as shown in FIG. 3, the device can be moved down the edge of the workpiece. Indexing pin 6 (FIG. 1 and FIG. 3) has a tapered point to accommodate different diameter holes. Indexing pin 6 is biased downward by spring 19 retained by ring 27, and is guided by bearing 20 housed in bridge 2 (FIG. 1). When the point of indexing pin 6 is located in the last drilled hole, this positions the device for the next set of holes. Clearance holes 38 (FIG. 1) in base 1 (FIG. 1) allow for passage of indexing pin 6 and drill bits 28 as seen in FIG. 1. The device uses drill bits that are housed in holders 7 and 8 and retained by set screw 11. The center holder 8 is prevented from passing up through bearing 35 (FIG. 1) by a spring ring 36. Referring to FIG. 3, spring ring 36 acts as a stop against bearing 35 for the entire bit holder and gear assembly. Bit holders 7 are provided with a gear 24 for rotative motion. A portion of bit holder 7 protrudes out of gear 24 to couple with bearing 10 (FIG. 1) housed in safety hood 3 (FIG. 1 and FIG. 3). Bit holder 7 is biased upward by spring 23 captured between bearing 25 and gear 24.

FIG. 3 shows washer 21 above gear 24 on bit holder 8, retained by collar 22. Washer 21 is constructed of a size to catch the lip of gear 24 on bit holder 7. The axial travel of bit holders 7 and 8 is controlled by the full compression of spring 23. Safety hood 2 rests on the shank portion of bit holders 7 and 8 that pass through bearings 10. Safety hood 2 retained in place by collar 22 (FIG. 3). The remaining shank length on bit holder 8 is for connection to an electric drill motor.

When downward pressure is applied to bit holder shaft 8, the gear assembly and hood move downward. When downward pressure is removed from bit holder shaft 8, the gear assembly and hood 3 are moved upward by springs 23.

I claim:

1. A device for drilling a series of holes in the face of a workpiece relative to a first edge and a second edge perpendicular to the first edge, comprising a generally rectangular base, a plurality of aligned drills mounted vertically movably on the base, a plurality of spring biased stop pins retractably mounted on the underside of the base, the row formed by the stop pins being parallel to the row formed by the aligned drills such that the drills may be located a fixed distance from the second edge by the stop pins, first adjustable stop means located on a first edge of the base adjacent and generally parallel to the stop pins for adjustably setting the distance of the drills from the second edge of the workpiece when the spring biased stop pins are retracted into the underside of the base, second adjustable stop means located on a second edge of the base, the second edge of the base being perpendicular to the first edge, the second adjustable stop means being selectively engaged or disengaged with the first edge of the workpiece, and at least one index pin on the base for insertion into a previously drilled hole when drilling new holes in line with previously drilled holes.

2. The drilling device of claim 1, wherein the second adjustable stop means includes a rectangular plate with a hole in the center, a headed adjustment screw extending through the hole in the plate and into a first threaded hole in the second edge of the base, a collar located on the opposite side of said plate from said screw head and having an aperture through which the headed adjustment screw passes, means locking the collar on the headed adjustment screw such that the plate is pivotally secured between the collar and screw head without axial play, whereby the rectangular plate is pivoted to a position extending below the base in order to position the base adjacent said first workpiece edge and the plate is then pivoted approximately 90° to a position above the base underside to permit the base to be repositioned along the workpiece face.

3. The drilling device of claim 2, further including a second threaded hole in the base perpendicular to said first threaded hole, and a screw extending through said second threaded hole to lock the headed adjustment screw in an adjusted position on the base.

4. The drilling device of claim 3, wherein the first adjustable stop means includes two units spaced along the first edge of the base, each unit including a washer with a hole in the center, an adjustment screw extending through the hole in the washer and into a threaded hole in the first edge of the base, and means on the adjustment screw to prevent the washer from moving axially on the adjustment screw.

5. The drilling device of claim 4, further including locking screws in threaded holes in the base perpendicular to each threaded hole for the adjustment screws of the first adjustable stop means, said locking screws securing the adjustment screws in an adjusted position.

* * * * *